3,574,674
COPY SHEET FOR USE IN REPRODUCTION OF IMAGES FROM PRINTED SURFACES

William P. Taylor, Hamilton, Ohio, assignor to U.S. Plywood-Champion Papers Inc., Hamilton, Ohio
Filed May 1, 1967, Ser. No. 635,182
Int. Cl. B41m 5/00; B32h 27/08, 27/24
U.S. Cl. 117—138.8                                   11 Claims

ABSTRACT OF THE DISCLOSURE

A copy sheet for reproducing an original printed sheet by moisture diffusion in the absence of special heat, light and electricity. The copy sheet having an impermeable transparent base and a moisture permeable, colored surface layer which when moistened and applied to the printed sheet for several seconds reproduces the printed image on the copy sheet in contrastingly visible color, readable from its transparent base side. The copy sheet being produced by forming a moisture permeable, thermoplastic surface layer containing a combined dye or pigment on a transparent impermeable base sheet.

RELATED APPLICATIONS

Figure 1:
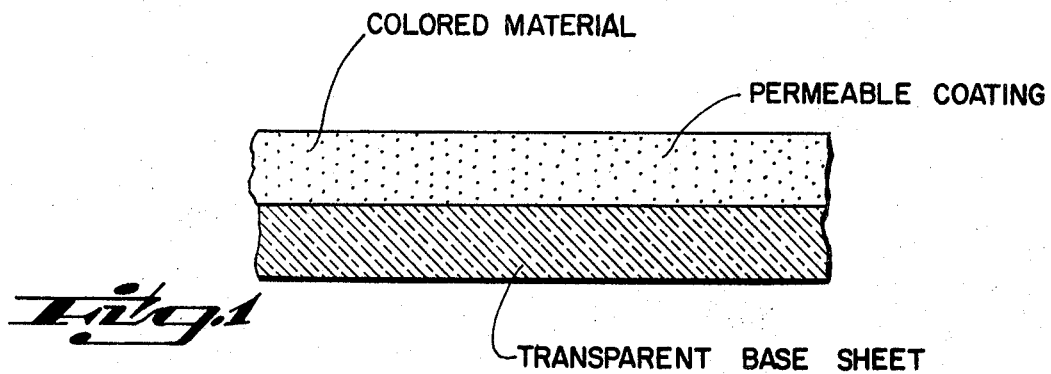

The present invention relates to the new concept in copying described in my copending applications Ser. No. 498,821, filed Oct. 20, 1965 and now U.S. Pat. No. 3,514,305 and Ser. No. 570,294, filed Aug. 4, 1966 and now U.S. Pat. No. 3,514,306.

BACKGROUND OF INVENTION

In my copending applications, Ser. No. 498,821 and Ser. No. 570,294, the reproduction of images from original printed sheets is described by a process which involves simply holding a copy sheet on the printed sheet for a few seconds in the absence of special heat, light and electricity. In accordance with that process, when the moisture content of a printed sheet and copy sheet is different, moisture vapor will migrate from one sheet to the other to a greater extent in the non-image areas than in the image areas. This selective migration is due, in part, to the fact that printing ink or the physical change in the structure of the sheet produced by the printing process which establishes the image areas provides a barrier to the migration of vapor at the image areas.

As described in my previous applications, a copy sheet having a transparent base and a surface film capable of having its optical properties changed by a moistening liquid can reproduce images without any treatment being required other than the application of the moistened film to the printed sheet. The images reproduced are advantageously right-reading "transparencies," that is, they are readable from the transparent base side of the copy sheet by reason of contrast between relative whiteness and transparency in image versus non-image areas, or vice versa. These transparencies are entirely adequate for direct visual reading or for projection and the like. Their readability by reflected light can be improved if they are held at a suitable angle or observed against a dark background sheet.

However, when numbers of transparencies are made and studied intensively, several deficiencies have become apparent. It is necessary to pick up each transparency individually and view it under favorable conditions, instead of reading each copy in a pile successively by reflected light. Further, the character of the image reproduced on the copy sheet transparency is usually, as mentioned, a contrast between whiteness and transparency or between two levels of translucency thereby not providing the sufficiently desirable visual contrast between image and non-image areas. Also, images reproduced on the transparency type of copy sheet can be somewhat delicate and subject to being damaged by fingerprints, dirt and abrasion. The transparency copies tend to be of uneven quality since optimum contact time varies with temperature, relative humidity and the type of documents being copied.

SUMMARY OF INVENTION

The present invention is directed to a copy sheet especially adapted for use in the reproduction of images from printed surfaces by the basic moisture diffusion technique described in my copending applications, above mentioned.

The copy sheets provided by this invention, in addition to providing right-readable images, have several unique and distinct adantages over the "transparencies" above described. First, the copy sheet of the present inention is capable after image reproduction of exhibiting enhanced and remarkable visual contrast between the reproduced image and non-image areas. For example, images can be reproduced in the copy sheet which are right-readable as white printing images on black or dark color background. Upon visual inspection, therefore, their readability is exceedingly enhanced.

The copy sheets according to the present invention also possess the desirable feature of providing reproduced images which are capable of being read when the copy sheets are stacked successively upon one another in a pile or assembled in books and ordinary manuscripts. Further, these copy images are more resistant to mechanical damage by fingerprints, dirt and abrasion without affecting reproducibility in sharp contrast.

It has also been found that the copy sheets of this invention have the capability of acting as their own "exposure meter" by undergoing a visible change in reflectivity when moistened and ready for contact with the printed document to be copied. These copy sheets also permit visual inspection of the image as it develops and provide a visual indication of when contact with the document being copied can be terminated.

Figure 2:
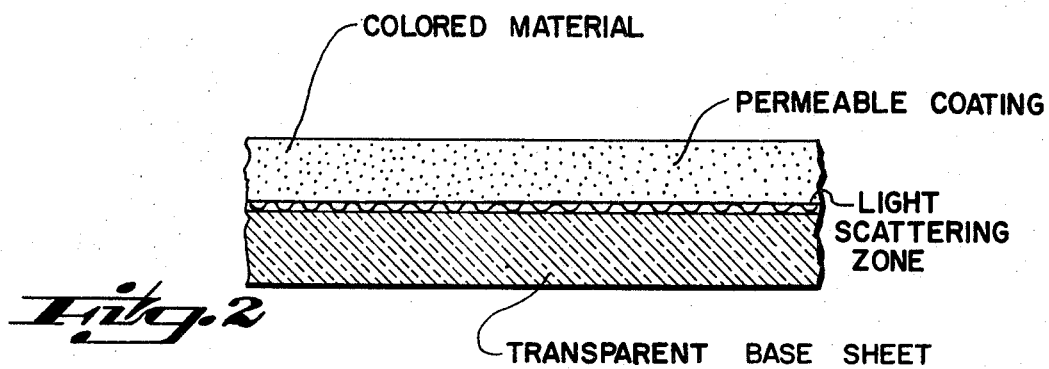
Figure 3:
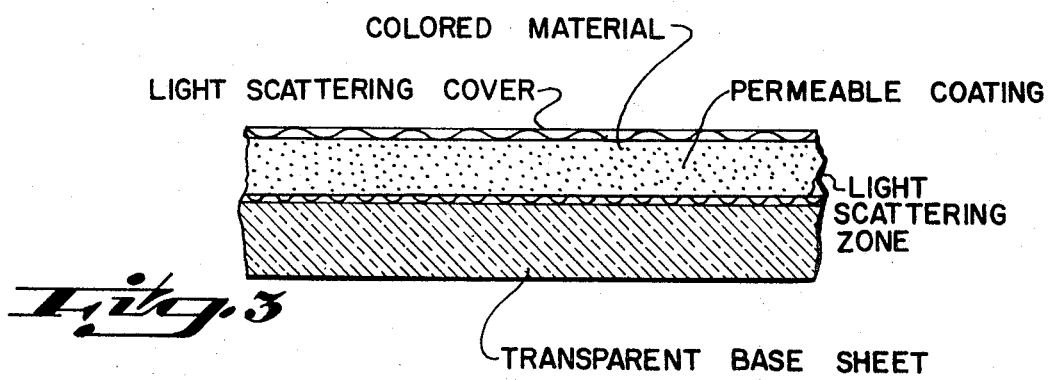

In the summary of this invention and a copy sheet provided in accordance with it, a better understanding will be had by reference to the drawing in which FIGS. 1–3 serve to diagrammatically illustrate, in cross-section, copy sheet structure and composition, labeled accordingly.

Referring to FIG. 1, the copy sheet provided by this invention comprises a transparent, impermeable base sheet having a moisture permeable coating formed on a surface of the base sheet. A moisture permeable colored material, i.e., a dye or pigment, is combined in the permeable layer. The colored material combined in the moisture permeable coating is adapted for contrasting permanent optical contact with the transparent base sheet upon diffusion of moisture between the permeable coating and a juxtaposed printed document during reproduction.

The moisture permeable surface coating of the copy sheet containing combined colored pigment or dye are essential to this invention. The combination provides the copy sheet with the capability of being employed to reproduce images via the mentioned diffusion technique and secure the unique and advantageous results, above mentioned. The colored material is moisture permeable, that is, when combined in the permeable coating it does not prevent moisture diffusion in that coating. The colored material is adapted for contrasting permanent optical contact with the transparent base sheet upon diffusion copying. This means the color is seen contrastingly from the transparent side of the sheet as between the image and non-image areas of the permanent image formed upon diffusion copying a printed original. Thus, the observer of the copied image does not have to distinguish between the contrast of whiteness and transparency or two levels of translucency as provided in my previously described "transparencies."

The combined distribution of the pigment in the image forming surface coating of the copy sheet also permits stacking the copy sheets successively so that the top copy of the stack is readable without having to pick it up and individually examine it under preferred lighting conditions or interleafing a dark background page between each of the assembled copy sheets. In addition, the colored material has been found to reinforce an otherwise rather delicate image-forming coating against defacement without interfering with the primary mechanism of moisture diffusion which permits copies to be made in the absence of heat, light and electricity by merely contacting a moistened copy sheet with a printed document.

In another form, with reference to FIG. 2, the copy sheet of this invention comprises a transparent impermeable base sheet having a moisture permeable surface coating containing a combined dye or pigment with a light scattering zone or interface between the transparent base and the surface coating. The light scattering zone or interface is of such structure which obscures the appearance of the colored material when viewed by reflective and/or transmitted light from the transparent base sheet side of the copy sheet. In this form, images can be reproduced in the copy sheets in enhanced contrast which when viewed from the transparent side of the base appear as white or off-white on the colored or dark background. The images form at the light scattering interface or zone and are contrastingly visible against the colored material which makes selective optical contact with the transparent base sheet. The copy sheet in the condition diagrammatically represented in FIG. 2 gives the visual appearance of being double layered, that is, the permeable coating on the transparent sheet has a light scattering zone or interfacial layer when viewed from the transparent base side and a colored layer containing the pigment or dye which is visible from the coating side.

In another form, with reference to FIG. 3, the copy sheet of the present invention has a light scattering interface between the base and the colored coating, and a light scattering cover on the exposed surface of the coating, i.e., a visual "triple-layered" coating on the copy sheet. In other words, it has the features of the double-layered coating discussed above and in addition, has a light scattering cover. The light scattering cover is of such structure which obscures the appearance of the colored material when viewed by reflective and/or transmitted light from the coated side of the copy sheet. This light scattering cover serves as a protective layer by preventing any possibility of the colored material from rubbing off in the document to be copied and also improves mechanical durability of the image forming coating.

It has been found that copy sheets provided with the permeable pigmented-coating can also act as their own "exposure meter" after being sensitized with the moistening fluid, but before image reproduction by moisture diffusion between the copy sheet layer and a printed document. For example, a copy sheet after being sensitized with the moistening fluid and allowed to dry in air for a short time starts to "whiten" on the outermost or exposed surface of the permeable coating. It has been discovered that when this whitening starts to occur, the copy sheet is free from excess moisture and is in a condition at which exposure to the printed document can most desirably begin. A built-in copy sheet exposure meter is exceedingly advantageous for it permits, rather than relying upon the passage of time and changing conditions, the actual user to visually observe the condition of the copy sheet coating and be keyed-in by its change in reflectivity at the exact point when it is ready for contact with the printed document. Further, the observer by reason of the colored material combined in the permeable copy sheet coating can view image formation while the copy sheet is in contact with the printed document. This permits the operable period of contact time to be visually demonstrated and determines when contact can be terminated.

In a process of preparing copy sheets according to this invention, a moisture permeable coating containing a combined colored material is formed on one surface of a transparent impermeable base sheet. It is preferred to form the copy sheet with a light scattering image-forming interface between the transparent base and the coating to provide for exceedingly enhanced readability of copy sheet images as noted above.

One process for preparing the copy sheets includes applying to a surface of a transparent impermeable base sheet a mixture containing a thermoplastic polymer, a solvent for said polymer and a colored dye or pigment. The coated sheet is dried and then treated with a liquid which permeates or swells the coating. The permeated coating is then rinsed with a leaching solvent to selectively remove the permeating liquid. At this point, the coated sheet with the moisture permeable colored material containing coating can be moistened with sensitizing liquid and used for copying. Alternatively, after rinsing, the coated sheet can be dried to form a dried moisture permeable coating containing a combined colored material with a light scattering interface between the transparent base and the coating. In its dried or moist condition, the copy sheet can be stored for future use.

In an alternative process, the copy sheet is prepared by applying to a transparent base sheet, a mixture containing a thermoplastic polymer, a solvent for the polymer and a colored material. The coated sheet can then, either in its dried state or relatively wet state, be washed with a leaching liquid to selectively remove the solvent and create the desired permeability in the coating with the combined pigment or dye.

This alternative process differs from the first described process in that the step of swelling is not necessary to create the permeability in the coating. The requirement for swelling will depend upon the particular coating formulation and the drying conditions. For example, when the coating has dried to a state in this alternative process, comparable to that achieved by the swelling step in the above described process, then reswelling before leaching will not be necessary. The copy sheet produced by the alternative process has the preferred interfacial image-forming layer as in the first described procedure and similarly can either be used for imaging immediately or stored as mentioned.

An additional copy sheet production technique has been found suitable, especially when providing inorganic pigmented copy sheets. For example, the coating mixture of thermoplastic polymer, an inorganic color former such as lead nitrate or silver nitrate, and a solvent can be coated onto a transparent base sheet. The coated sheet is then contacted with a color reactant solution which reacts with the color former (i.e., for example, sodium sulfide aqueous solution for the lead or silver nitrate) to precipitate the colored pigment product in the coating. The coating is rendered permeable either upon treatment with the color reactant solution or by subsequent rinsing with a suitable solvent. Copy sheets have been produced by this method which possess the characteristic interfacial light scattering zone between the base sheet and the permeable coating. When images are reproduced on copy sheets containing inorganic pigment coatings of this type, white printing images are produced on dark colored background.

The base sheet of the copy sheet of this invention, and as used in the above processes, should be impermeable to the transmission of moisture or otherwise the moisture would tend to migrate through the base sheet rather than operating in the permeable surface coating to undergo the mechanism of moisture diffusion between a juxtaposed printed sheet. The base sheet is transparent to permit right-readable images of color contrast in the image-forming colored coating. Of course, the base should be of such character as to permit it to be firmly bonded to the colored coating so that the coating will not part from the base. Suitable base sheet materials are of the character described in my previous applications, above mentioned, and include such plastic materials as, for example, polyethylene, polystyrene, cellulose acetate, poly (ethylene terephthalate), and the like.

The moisture permeable, colored material containing surface coating on the copy sheet is preferably formed by a dyed or pigmented polymeric material. The thermoplastic polymer resins are most suitable. Thermoplastic resins are capable of being blended with suitable pigment or dye and solvent or dispersing medium in accordance with this invention to provide the coating mixtures which form permeable coatings which undergo essential optical change upon diffusion of moisture between the copy sheet and the printed document to be copied. Suitable thermoplastic materials include, polyvinyl butyral, polyvinyl acetate, cellulose nitrate, ethyl cellulose, polyvinyl acetate-crotonic acid copolymer, cellulose acetate-butyrate and similar thermoplastic materials of the type described in my copending applications.

Suitable solvents and dispersing mediums for preparing the thermoplastic resin coating formulations include organic solvents and/or plasticizers, preferably of the water miscible type. Water miscible solvents and/or plasticizers are preferred because water controls their solvent power and they can be removed from the coating by washing with water to create a permeable layer. For example, such solvents include alcohols, glycol-ethers, ketones, dioxane, dimethyl sulfoxide, N-methyl-2-pyrrolidone, propylene carbonate, diethylene glycol, polyoxyethylene glycols, etc. Also, the aqueous organic solvent and/or plasticizer mixtures can be blended with suitable miscibility enhancing materials which are soluble in both the organic component and in water. For example, suitable materials include urea, ammonium thiocyanate, zinc chloride, poly (vinyl methyl ether-maleic anhydride), carboxyl-containing styrene copolymers and the like.

Colored materials used in this invention are those which can combine in the permeable copy sheet coating and do not prevent moisture diffusion in the permeable coating, that is, the colored materials are moisture permeable. Physical or chemical combination of the colored materials in the permeable coating is important for otherwise they will simply wash out either in the formation of the permeable coating and fail to essentially modify its image forming properties or, when the layer contacts the printed document, they could migrate into it and deface it. Suitable colored materials include the organic dyes and inorganic pigments such as carbon black, oil red (Color Index-Solvent Red 24, 26105, azo and aniline dyes, organic amino dyes such as those sold under the trademark "Pontamine Brilliant Green G.X." by Du Pont de Nemours & Co., Inc., lead sulfate, silver sulfide and the like.

Permeating liquids which are used to create the permeability in the thermoplastic coating which has been applied to a transparent base include alcohols such as diacetone alcohol; glycol-ethers such as ethylene glycol monoethyl ether diethylene glycol, etc.; cyclic organic compounds such as 1,4 dioxane, butyrolactone and N-methyl-2-pyrrolidone; acids such as acetic or formic; glycol diacetate, propylene carbonate and other ketones and esters.

The permeable coating on the copy sheet is preferably very thin, that is, in the range of 0.25 to about 50 microns and preferably in the range of about 0.25 to 15 microns. The relative thickness or thinness of the film and the underlying considerations are essentially the same as those described in my copending application Ser. No. 570,294.

The copy sheet of this invention can be sensitized with sensitizing liquids similar in character to those employed in my copending applications, for example, those described in my copending application Ser. No. 570,294. The sensitizing liquid can be water alone because of its advantageous properties of being colorless, odorless, nontoxic and it has no adverse effect on the printed page to which it is exposed. Water can also be mixed with organic solvents. The sensitizing liquid according to this invention should have an additionally important property in that its solvent power on the dye or pigment in the coating must be minimal so that it cannot dissolve the pigment or dye out of the coating into the original being copied. Suitable sensitizing liquids which have been employed for use with the pigmented or dyed copy sheets of this invention include a liquid or mixture of liquids, for example, water, aliphatic alcohols including ethyl alcohol and methanol, propylene carbonate, dioxane, diacetone alcohol, glycol-ethers of the diethylene glycol monoethyl ether or diethylene glycol type, glycol diacetate, and the like. The sensitizing liquids are preferably diluted with water and/or mixed with other miscible materials which control solubility and solvent action.

The printed sheet or original printed document capable of being reproduced with the copy sheet of the present invention is of the type described in my copending applications and is normally formed of cellulose fibers which may or may not be coated with pigments and binders found in paper applications. The printing on the sheet creates the areas of lesser sorptivity to moisture than the unprinted areas and as a consequence, the printed sheet has the required disparate sorptivity or avidity for the sensitizing moisture as between the image and non-image areas. Therefore, the term printed sheet includes those sheets which have been printed by conventional means such as letterpress, gravure, offset and the like in addition to typed, carbon copied, electrostatically reproduced and hand drawn sheets.

The copy sheet is employed in the reproduction of images basically by the technique described in my previous applications, but with certain unique improvements due to the copy sheets provided by this invention. Once the copy sheet with the moisture permeable colored coating has been prepared and moistened with the sensitizing liquid, it is placed against the printed sheet with the coated layer in contact with the surface of the printed sheet. The copy sheet, before being placed against the printed sheet in accordance with this invention, has the additional feature of providing its own exposure meter which determines by visual means the precise time that it should be exposed to the printed sheet. Generally, the copy sheet is held against the printed sheet for a short period of time as, for example, about 2–30 seconds. The length of time should be sufficient to permit moisture to migrate out of the coating to differential extents in the respective areas overlying the image and non-image areas of the printed sheet. With the copy sheet of the present invention, this length of time is visually perceptible because the observer can view the formation of the image through the transparent base side while it is increasing in visual intensity, as mentioned above. The copy sheet is then removed from the printed sheet after image reproduction has been effected and when removed the image will be strikingly visible in contrast. Generally, the image will consist of white or light colored printing on dark colored background. In certain instances, the contrast is reversed, that is to say, the printing will appear as a dark colored image against a light colored background. However, in either case strikingly exhibited readability is due to the contrast in color between the image and non-image areas of the copy sheet.

The following examples serve to further illustrate the principles of this invention and its practice, but they are not to be regarded as limiting the scope of this invention.

EXAMPLE 1

A cellulose nitrate lacquer was prepared by dissolving 3 grams of cellulose nitrate in enough methanol to make a 30 ml. solution and then adding 90 ml. of ethylene glycol monoethyl ether. Then, 3 grams of a carbon black dispersion, sold under the name "Carbon black/NC 85–B104C" by Sun Chemical Corporation, were added to methanol to make a 30 ml. dispersion. "Carbon black/NC 85–B104C" contained by weight 13.3% carbon black, 66.7% cellulose nitrate and 20% plasticizer. The carbon black dispersion in methanol was then added to the previously prepared cellulose nitrate lacquer. The resulting pigmented lacquer was coated on one side of a transparent polystyrene sheet and allowed to dry. The dried, coated sheet when viewed from either its base side or coated side appeared black and the coating was approximately 2–5 microns in thickness.

The coated polystyrene sheet was then dipped in a solution containing 60 ml. ethylene glycol monoethyl ether, 60 ml. N-methyl-2-pyrrolidone, 60 ml. polyethylene glycol (having an average molecular wt. of 600) and 30 ml. water. The coated sheet was removed and allowed to drain for about 15–20 seconds before rinsing in water with vigorous agitation. After drying, the coated sheet when viewed from its transparent base side had a metallic light gray appearance (i.e., "gun-metal grey"), but appeared dull black when viewed from its coated side.

The coated sheet was then used as a copy sheet to reproduce a printed original sheet. The copy sheet was first soaked in a 4% solution of glycol diacetate in water, blotted free of excess liquid and allowed to dry until the outermost surface of the coating began to whiten. This "whitening" of the copy sheet coated surface upon drying provided a built-in "exposure meter" indicating the copy sheet coated surface was suitably sensitized for reproducing a printed original. At this point, the coated surface of the polystyrene was held in uniform contact with a printed page of paper for about 20–30 seconds to give a permanent readable image on the coated surface. The formation of the image could be viewed from the transparent base side of the copy sheet during contact with the printed sheet. The reproduced printed image on the copy sheet when viewed from the transparent base side was right-reading and it appeared as relatively white or light-grey printing against relatively dark grey or black background.

Copy sheets having images of the above character can be stacked in a pile and the top copy is easily readable.

EXAMPLE 2

The procedures of Example I were repeated except that the prepared copy sheet was treated with a 10% solution of diacetone alcohol in water instead of the 4% solution of glycol diacetate in water prior to its contact with the printed page. Upon exposure to a printed sheet as in Example 1, a readable image was reproduced in like manner on the coated surface of the copy sheet. The copy sheet image was of the same character as that reproduced in Example 1.

EXAMPLE 3

The procedures of Example 1, first paragraph, were followed to produce the lacquer coated polystyrene sheet. The coated sheet was then dipped in a solution of 4 parts by volume glacial acetic acid, 1 part by volume glycol diacetate and 1 part by volume water, drained for about 10 seconds and subsequently rinsed in water. When dried, the thus formed copy sheet appeared "gun-metal grey" from its transparent base side and dull black from its coated side as in Example 1. When the copy sheet was soaked in a 5% solution of glycol diacetate in water and exposed to the printed sheet as in Example 1, similar results were obtained.

EXAMPLE 4

Three grams of a polyvinyl acetate-crotonic acid copolymer containing 3% crotonic acid were dissolved in acetone to make a 30 ml. solution and then a carbon black-methanol dispersion as prepared in Example 1 was added. The resultant pigment-polymer mixture was diluted with 90 ml. ethylene glycol monoethyl ether and the diluted mixture was coated onto one side of a transparent polystyrene sheet. After drying, the coated sheet was dipped in 4 parts by volume glacial acetic acid and 1 part by volume water for about 10 seconds to swell the coating and then rinsed in water. When dried, the coated sheet possessed the same "gun-metal grey" surface as described for the copy sheet in Example 1.

The coated sheet was then soaked in a 4% solution of ethylene glycol monobutyl ether in water, wiped free of excess liquid and allowed to dry for about 20–30 seconds until the outermost surface of the coating began to whiten. This "whitening" provided a built-in "exposure meter" similar to that described for the copy sheet in Example 1. The moist, coated side of the copy sheet was then held in uniform contact with a printed sheet until a readable image was visible. A light-grey or white image of printing against a dark grey or black background was right-reading when viewed from the transparent base side of the copy sheet.

EXAMPLE 5

The procedure of Example 4, first paragraph, was followed to produce a copy sheet. This copy sheet was then soaked in a 3.2% solution of glycol diacetate in water, wiped free of excess liquid and allowed to dry for about 30 seconds until it began to whiten. The coated side of the copy sheet was then held in uniform contact with a printed page for about 10 seconds to give an image having similar characteristics as these described for the copy sheet image of Example 5.

When polypropylene or cellulose acetate is substituted for the polystyrene transparent base material of Examples 1 to 5, and procedures equivalent to those recited are performed, copy sheets of the same character are produced which can be used for copying as described therein with similar results.

EXAMPLE 6

A carbon black stock solution was prepared by combining 300 parts by weight of a carbon black dispersion (sold under the name "Carbon Black/NC 85–B104C" by Sun Chemical Corporation and identified in Example 1), 928 parts by weight methanol, 120 parts by weight plasticizer sold under the trademark "Santolite MHP" by Monsanto Company (this plasticizer is a resinous condensation product of aryl sulfonamide and formaldehyde) and 3 parts by weight oleic acid. Thirty ml. of the carbon black stock were mixed with a solution containing 3 grams of ethyl cellulose dissolved in 15 ml. acetone, 165 ml. ethylene glycol monoethyl ether and 30 ml. dioxane. The resultant pigment-polymer mixture was then applied to one side of a transparent polystyrene sheet and allowed to dry. The dried coating was approximately 5 microns in thickness.

The dried, coated polystyrene sheet was then dipped in a mixture of 1 part by volume butanol and 4 parts ethylene glycol monoethyl ether, drained for 15 seconds, rinsed in water and then dried. The thus formed copy sheet gave the appearance of a transparent base material having a "triple layered" coating, i.e., the copy sheet appeared "gun-metal grey" from its base side, off-white from the outermost surface of its coated side and had a black center zone between the metallic grey and white areas.

The copy sheet was then dipped in a 10% by volume aqueous solution of ethylene glycol monobutyl ether, wiped and allowed to dry for about 20 seconds until the surface began to whiten. The coated side of the polystyrene sheet was then held in uniform contact against the printed paper until a readable image appeared. The image appeared at first as dark printing on light background and then after the copy sheet was removed, the copy sheet image was light grey or off-white against a dark grey or black background.

EXAMPLE 7

The procedures of Example 6 were repeated except a 6% aqueous solution of propylene carbonate was used instead of ethylene glycol monobutyl ether to give a copy sheet image of the same character as that described in Example 6.

EXAMPLE 8

Ten grams of a 5% by weight dispersion of carbon black in glycol, available as "EL-2388" from Interchemical Corporation, was mixed with 60 ml. ethylene glycol monoethyl ether and 3 grams polyvinyl butyral dissolved in 80 ml. methanol. The mixture was coated onto one side of a polystyrene sheet and allowed to dry overnight. After drying, the coated polystyrene sheet was then rinsed in water, dipped in 4 parts by volume glacial acetic acid plus 1 part water, water-rinsed and dried. The coated sheet had the "gun-metal grey," light scattering appearance when viewed from its polystyrene base side. This copy sheet, when soaked in either a 5% aqueous solution of propylene glycol or a 10% aqueous solution of diethylene glycol and exposed to a printed sheet for about 20–30 seconds, reproduced images like those of previous examples.

EXAMPLE 9

A solution of 3 grams of polyvinyl butyral, 0.5 gram of oil red dye by Du Pont de Nemours & Co., Inc. (Color Index Solvent Red 24, 26105) in 50 ml. methanol and 50 ml. ethylene glycol monobutyl ether was prepared. This solution was applied to a base sheet of transparent polystyrene and then dried to a deep clear red, visible from both sides of the sheet. The coated sheet was then dipped in 4 parts by volume glacial acetic acid in 1 part water for about 10 seconds, then drained for about 20–30 seconds, and then rinsed in water. When dried, the copy sheet visually appeared to have a light scattering pink interface between the base and the coating when viewed from the base side.

The copy sheet was moistened by dipping in a 3% aqueous solution of ethylene glycol monobutyl ether, wiped free of excess liquid, and then allowed to dry for about 15 seconds until the surface began to whiten (the same "exposure meter" effect noted in the above examples). The coated side of the copy sheet was then held in contact with a printed page for about 15 seconds to give a readable image. This image, of the printing when viewed from the transparent base side of the copy sheet, was white on a deep red background.

EXAMPLE 10

Sixty ml. of a 10% solution in methanol of polyvinyl acetate-crotonic acid copolymer containing about 3% crotonic acid were combined with 3 grams of dye sold under the trademark "Pontawine Brilliant Green GX" by Du Pont de Nemours & Co., Inc. and enough ethylene glycol monoethyl ether to make 150 ml. of solution. Nine ml. of diethylene glycol were added to this solution to make a coating mixture.

A sheet of transparent polystyrene was then coated on one side with the coating mixture and allowed to dry overnight. The sheet dried to a yellow-green color, visible from both sides. The coated sheet was then rinsed in water, blotted, dried until the outermost surface of the coating began to turn white. The coated side of the sheet was then placed in uniform contact with a printed page for 5 to 20 seconds. The image of the printing reproduced on the copy sheet was whitish on a yellow-green background.

Copies reproduced on copy sheets used in this example could be stacked on top of each other and the top copy sheet was readable.

EXAMPLE 11

Two grams of lead nitrate were dissolved in 4 ml. of water. This solution was mixed with 75 ml. of ethylene glycol monoethyl ether and 45 ml. acetone which contained 1.5 grams ethyl cellulose.

A base sheet of transparent polystyrene was coated with the above mixture, allowed to dry for a few minutes and then, while still wet, dipped in sodium sulfide solution (94 grams per liter). The dried coating was brown in color when the sheet was viewed from its coated side, but silvery grey or light colored when viewed from the base sheet side.

The coated sheet reproduced images when its coated side was moistened with a 10% aqueous solution of butyl Cellosolve, dried for about 5 seconds and exposed to a printed sheet for about 10 seconds. The image on the copy sheet was plainly readable white printing on brown background when viewed through its transparent base, but almost invisible from its coated side.

EXAMPLE 12

One-half gram of silver nitrate was dissolved in 1 ml. water plus 4 ml. Cellosolve and then the solution was added to 1.5 grams of polyvinyl butyral dissolved in 30 ml. methanol. The resulting solution was flowed on a transparent polystyrene sheet and drained for a few minutes. The coated sheet was then floated face down on a sodium sulfide solution (94 grams per liter), then rinsed and dried. The coated sheet was clear brown in appearance when viewed from its coated side but had a whitish interface or light scattering zone when viewed from the transparent base side.

This sheet produced copies when moistened with a 2% aqueous solution of butyl Cellosolve and exposed to a printed sheet for about 25 seconds. The image was a positive whitish print on brown background.

EXAMPLE 13

Two grams of cupric chloride were dissolved in 4 ml. water and 15 ml. Cellosolve. Forty-five ml. of acetone and 15 ml. of Cellosolve containing 1.5 grams of ethyl cellulose were added to the cupric chloride solution. When the mixture was flowed on one side of a transparent polystyrene sheet and dried, it was ivory in color when viewed from both sides of the sheet.

The coated sheet was dipped into methanol saturated with dithio oxamide and the coating turned a very dark brown. After rinsing in water and drying the sheet developed a dark brown coating with a whitish interface or light scattering zone between the dark brown coating and the transparent polystyrene base sheet.

The coated sheet produced copies having a white image on brown background upon being moistened with 10% aqueous solution of ethylene glycol monobutyl ether and exposed to a printed sheet for about 10–20 seconds.

I claim:

1. A copy sheet for reproducing an original printed sheet in the absence of special heat, electricity and light by diffusion of moisture between said sheets which comprises
    a transparent base sheet impermeable to the transmission of said moisture,
    a very thin moisture permeable coating up to about 50 microns in thickness firmly bonded and formed on a surface of said base sheet and being capable of retaining moisture and
    a colored material selected from the group consisting of a dye and a pigment combined in said permeable coating, said colored material being permeable to the diffusion of said moisture and being combined in said coating so as to prevent its migration into the original printed sheet upon the diffusion of said moisture, said colored material being adapted for contrasting permanent optical contact with said transparent base upon diffusion of said moisture between said permeable coating and said printed sheet, said permeable coating with colored material combined therein having the property of acting as a moisture exposure meter when sensitized with the moisture but before said reproduction by undergoing a change in reflectivity of its exposed surface which can be visually observed, said permeable colored-coating having the property of acting as a contact exposure meter when moistened which determines by visual means the precise length of time for exposure of the copy sheet to the printed sheet in said reproduction.

2. A copy sheet according to claim 1 having a light scattering interface between said transparent base sheet and said coating.

3. A copy sheet according to claim 2 having a light scattering cover on the exposed surface of said coating.

4. A copy sheet according to claim 1 wherein the transparent base sheet is a plastic and the moisture permeable coating comprises a thermoplastic polymer.

5. A copy sheet according to claim 4 wherein the material for the plastic base sheet is selected from the group consisting of polystyrene, polyethylene, polypropylene, poly (ethylene terephthalate), and cellulosic derivatives and said thermoplastic polymer is selected from the group consisting of polyvinyl acetate, polyvinyl butyral, cellulose nitrate, cellulose acetate, ethyl cellulose, polyvinyl acetate-crotonic acid and cellulose acetate-butyrate.

6. A copy sheet according to claim 1 with said moisture permeable coating having a thickness in the range of about 0.25 to about 15 microns.

7. A copy sheet for reproducing an original printed sheet in the absence of special heat electricity and light by diffusion of moisture between said sheets which comprises a transparent plastic base sheet impermeable to the transmission of said moisture, a moisture permeable coating having a thickness in the range of about 0.25 to 50 microns formed and firmly bonded on a surface of said base sheet, said coating being capable of retaining moisture and comprising a thermoplastic polymer selected from the group consisting of polyvinyl acetate, polyvinyl butyral, cellulose acetate, cellulose nitrate, ethyl cellulose, polyvinyl acetate-crotonic acid and cellulose acetate butyrate, and a colored material selected from the group consisting of a pigment and a dye uniformly distributed and combined in said permeable coating, said colored material being permeable to the diffusion of said moisture and being combined in said coating so as to prevent its migration into the original printed sheet upon the diffusion of said moisture, said colored material being adapted for contrasting permanent optical contact with said transparent base upon diffusion of said moisture between said permeable coating and said printed sheet, said permeable coating with colored material combined therein having the property of acting as a moisture exposure meter after being sensitized with the moisture but before said reproduction by undergoing a change in reflectivity of its exposed surface which can be visually observed, said permeable colored-coating having a property of acting as a contact exposure meter when moistened which determines by visual means the precise length of time for exposure of the copy sheet to the printed sheet in said reproduction.

8. A copy sheet according to claim 7 wherein said colored material is carbon black.

9. A copy sheet according to claim 7 having a light scattering interface between said transparent base sheet and said coating.

10. A copy sheet according to claim 9 having a light scattering cover on the exposed surface of said coating.

11. A copy sheet according to claim 7 wherein said moisture permeable coating has a thickness in the range from about 0.25 to about 15 microns.

References Cited
UNITED STATES PATENTS

| | | | |
|---|---|---|---|
| 2,810,661 | 10/1957 | Newman et al. | 117—138.8X |
| 3,000,757 | 9/1961 | Johnston et al. | 117—145X |
| 3,180,752 | 4/1965 | Bollinger et al. | 117—138.8X |
| 3,298,895 | 1/1967 | Plambeck | 117—138.8X |
| 3,346,431 | 10/1967 | Hammonds | 117—138.8X |
| 3,392,042 | 7/1968 | Findlay | 117—138.8X |
| 3,403,042 | 9/1968 | Stead | 117—138.8X |

WILLIAM D. MARTIN, Primary Examiner

E. J. CABIC, Assistant Examiner

U.S. Cl. X.R.

117—1.7, 37R, 63, 138.8F, 138.8UA, 145, 161UF, 161UB, 161UC, 166; 161—160